United States Patent
Tsunoda

[11] Patent Number: 5,901,943
[45] Date of Patent: May 11, 1999

[54] DAMPER MECHANISM FOR AUTOMOTIVE AIR-CONDITIONER

[75] Inventor: Isao Tsunoda, Wako, Japan

[73] Assignee: Honda Giken Kogyo Kabushiki Kaisha, Tokyo, Japan

[21] Appl. No.: 08/799,404

[22] Filed: Feb. 12, 1997

[30] Foreign Application Priority Data

Feb. 16, 1996 [JP] Japan ................................ 8-029573

[51] Int. Cl.⁶ ........................................ B60H 1/00
[52] U.S. Cl. ......................... 251/294; 454/121; 251/901
[58] Field of Search ................................ 454/121, 156, 454/159, 160; 251/294, 901

[56] References Cited

U.S. PATENT DOCUMENTS

| | | | |
|---|---|---|---|
| 5,105,730 | 4/1992 | Smith | 251/901 X |
| 5,243,830 | 9/1993 | Ito et al. | 251/901 X |
| 5,564,979 | 10/1996 | Sumiya et al. | 454/121 |
| 5,653,630 | 8/1997 | Higashihara | 454/121 |
| 5,701,949 | 12/1997 | Yamaguchi et al. | 251/901 X |

FOREIGN PATENT DOCUMENTS

| | | | |
|---|---|---|---|
| 0459473 | 4/1991 | European Pat. Off. | 454/121 |
| 406074548 | 5/1994 | Japan | 454/121 |

*Primary Examiner*—John Rivell
*Assistant Examiner*—Meredith H. Schoenfeld
*Attorney, Agent, or Firm*—Birch, Stewart, Kolasch & Birch, LLP

[57] ABSTRACT

Opposite ends of a first film-like damper with a plurality of air vents defined therein at a given position are wound respectively on first and second takeup shafts, and a drive wire is coupled to the first and second takeup shafts. A wire has an end directly coupled to the drive wire at substantially intermediate position between the first and second takeup shafts. The other end of the wire is connected to a manually operable knob. When the knob is manually turned, the wire directly displaces the drive wire in the direction indicated by the arrow A or B, moving the film-like damper.

19 Claims, 21 Drawing Sheets

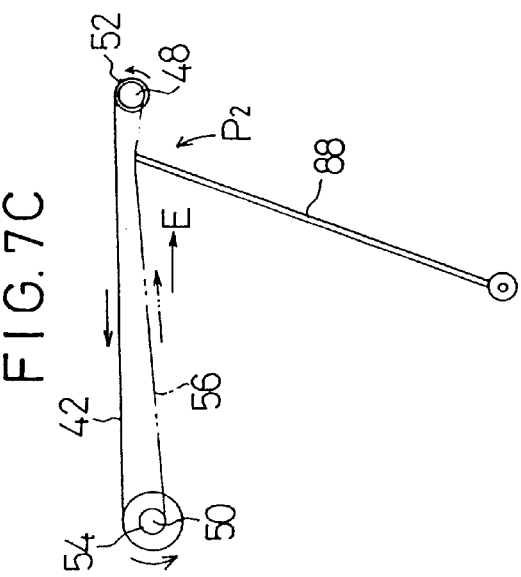
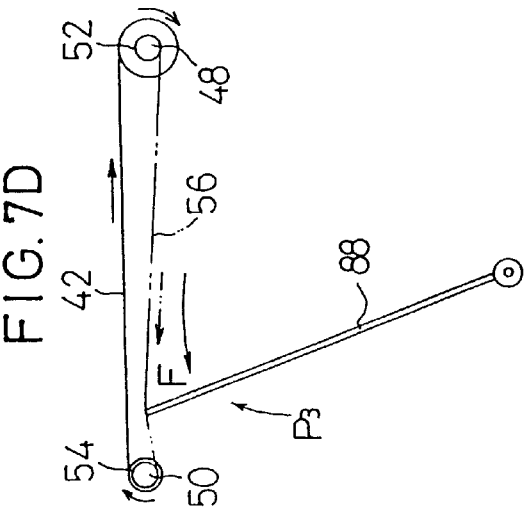
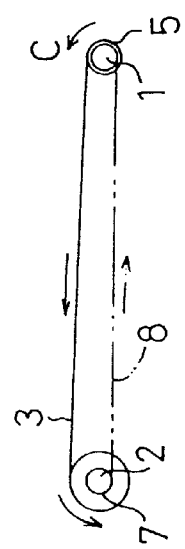
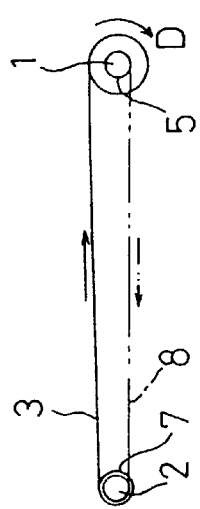

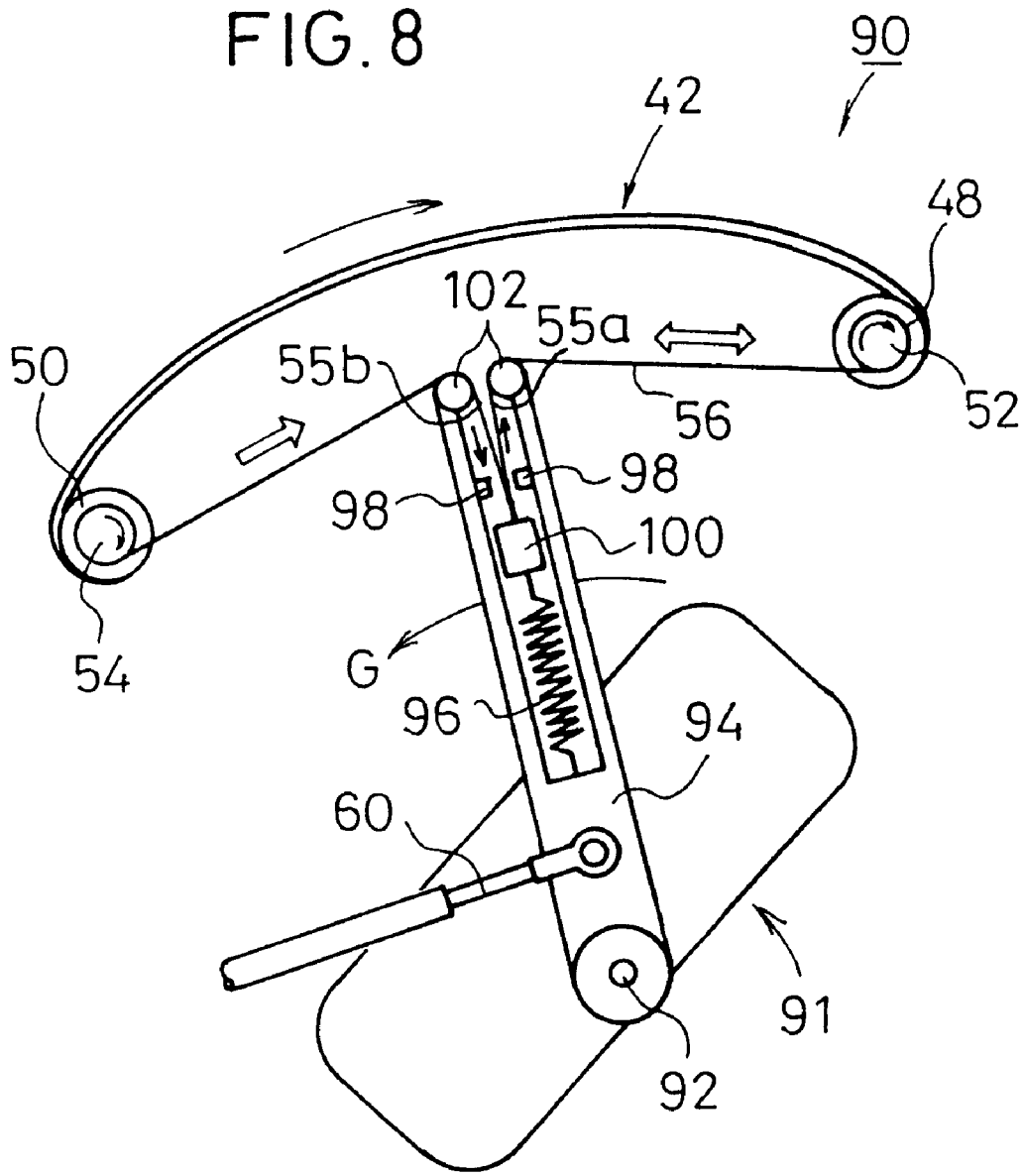

DAMPER MECHANISM FOR AUTOMOTIVE AIR-CONDITIONER

BACKGROUND OF THE INVENTION

1. Field of the Invention

The present invention relates to a damper mechanism for use in an automotive air-conditioner, which includes a film-like damper having air vents defined therein and opposite ends wound around first and second takeup shafts, respectively.

2. Description of the Related Art

Air-conditioners for use on motor vehicles such as automobiles comprise a blower unit, a cooler unit, an a heater unit. Such air-conditioners have an air-mixing damper for mixing hot air and cold air to determine the temperature of air to be introduced into a passenger's compartment and a mode-selecting damper for selecting one of air flow modes "VENT", "FOOT", and "DEF".

Those dampers have conventionally comprised plate-like dampers. However, damper mechanisms comprising film-like dampers have recently been used instead of plate-like dampers. One conventional damper mechanism comprising film-like dampers is shown in FIG. 23 of the accompanying drawings. As shown in FIG. 23, a film-like air-mixing damper 3 has opposite ends wound around drive and driven shafts 1, 2 which serve as takeup shafts, and also has a plurality of air vents 4 defined therein at a given position and extending over a predetermined length. The drive shaft 1 has an end fixed to a drive pulley 5 which is connected to the shaft of a stepping motor 6. The driven shaft 2 supports on one end thereof a driven pulley 7 on which a tension spring (not shown) acts. A wire 8 is trained around the drive pulley 5 and the driven pulley 7.

A film-like mode-selection damper 9 is similar in structure to the film-like air-mixing damper 3. Those parts of the film-like mode-selection damper 9 which are identical to those of the film-like air-mixing damper 3 are denoted by identical reference numerals, and will not be described in detail.

When the stepping motor 6 is energized, the drive shaft 1 is rotated in unison with the drive pulley 5 in one direction, winding or unreeling the film-like air-mixing damper 3. At the same time, the driven shaft 2 is rotated by the driven pulley 7 which is rotated by the wire 8, unreeling or winding the film-like air-mixing damper 3. The film-like air-mixing damper 3 is thus moved until the air vents 4 in the film-like air-mixing damper 3 reach a desired position. The air vents 4 thus positioned varies the ratio at which hot air and cold air are mixed, thereby adjusting the temperature of air introduced into the passenger's compartment.

When the driven shaft 2 winds up the film-like air-mixing damper 3 by rotation of the drive shaft 1, since the diameter of the roll of the film-like air-mixing damper 3 wound on the driven shaft 2 progressively increases, the angular displacement of the driven shaft 2 becomes smaller than the angular displacement of the drive shaft 1. Conversely, when the drive shaft 1 winds up the film-like air-mixing damper 3, since the diameter of the roll of the film-like air-mixing damper 3 wound on the drive shaft 1 progressively increases, the angular displacement of the driven shaft 2 becomes greater than the angular displacement of the drive shaft 1, resulting in a torque variation. To absorb such a torque variation, the stepping motor 6 is required to be of a large size capable of generating a torque sufficiently greater than a minimum drive torque which is necessary to rotate the drive and driven shafts 1, 2. Furthermore, a process of controlling the stepping motor 6 is considerably complex in order to position the air vents 4 in an accurate location for desired temperature adjustment.

SUMMARY OF THE INVENTION

It is a major object of the present invention to provide a damper mechanism for use in an automotive air-conditioner, which is relatively simple in structure and can be operated smoothly and highly accurately.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7A is a front elevational view showing how a film-like damper of the conventional damper mechanism is wound by a driven shaft;

FIG. 7B is a front elevational view showing how the film-like damper of the conventional damper mechanism is wound by a drive shaft;

FIG. 7C is a front elevational view showing how a film-like damper of the damper mechanism according to the second embodiment is wound by a shaft;

FIG. 7D is a front elevational view showing how the film-like damper of the damper mechanism according to the second embodiment is wound by another shaft;

FIG. 8 is a front elevational view of a damper mechanism according to a third embodiment of the present invention;

DETAILED DESCRIPTION OF THE PREFERRED EMBODIMENTS

Figure 1:
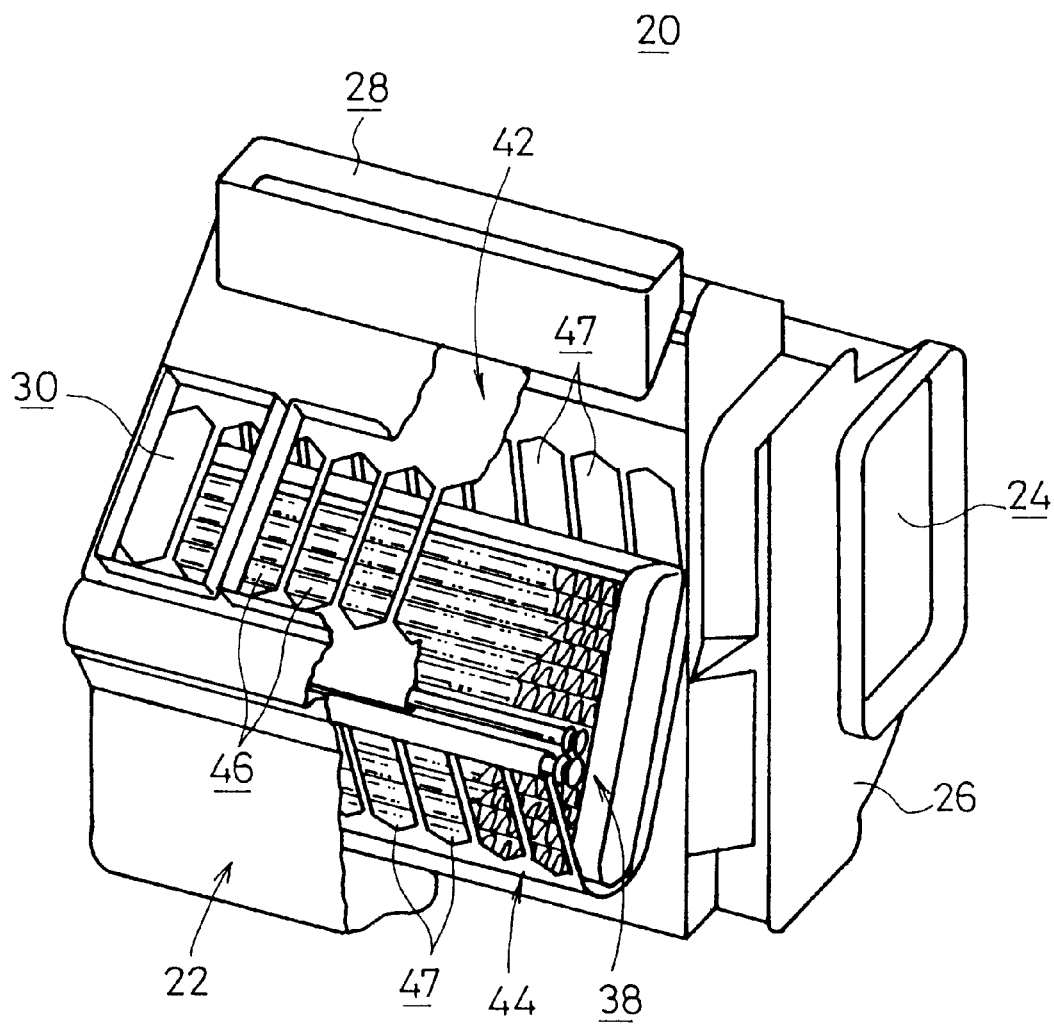
FIG. 1 is a perspective view, partly broken away, of an automotive air-conditioner which incorporates a damper mechanism according to the present invention.

Like or corresponding parts are denoted by like or corresponding reference characters throughout views.

Figure 2:
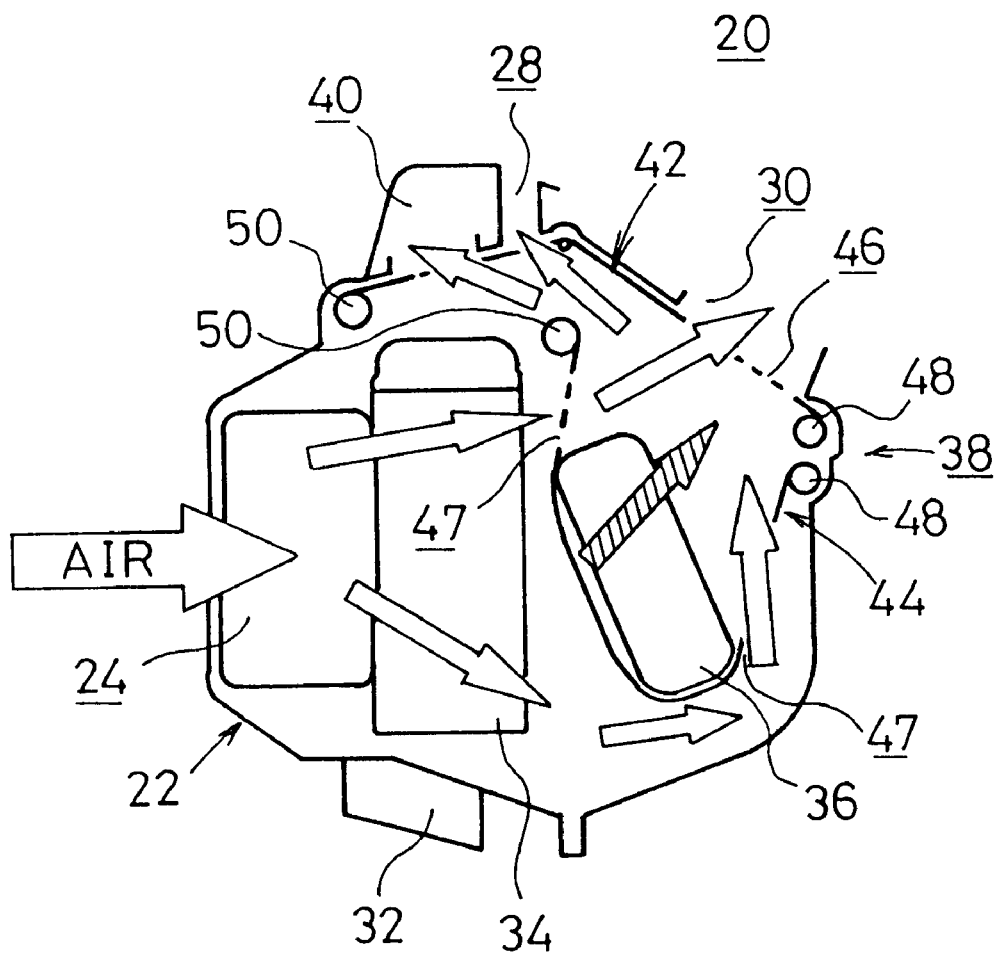
FIG. 2 is a schematic cross-sectional view of an internal structure of the automotive air-conditioner.

As shown in FIGS. 1 and 2, an automotive air-conditioner 20 which incorporates a damper mechanism according to the present invention has a case 22 and an evaporator maintenance lid 26 mounted on a side of the case 22 and having a blower opening 24. The case 22 has a DEF air outlet 28 on its upper end, a FACE air outlet 30 on its upper front side, and a FOOT air outlet 32 on its lower end. As shown in FIG. 2, an evaporator 34 is housed in the case 22 closely to the blower opening 24, and a heater core 36 is also housed in the case 22 in front of the evaporator 34.

A damper mechanism 38 according to a first embodiment 38 is mounted in the case 22. The damper mechanism 38 comprises a film-like mode-selecting damper (hereinafter referred to as a "first film-like damper") 42 extending in the case 22 across the FACE air outlet 30, the DEF air outlet 28, and a FOOT air passage 40, and a film-like air-mixing damper (hereinafter referred to as a "second film-like damper") 44 isolating the evaporator 34 from the heater core 36.

Figure 3:
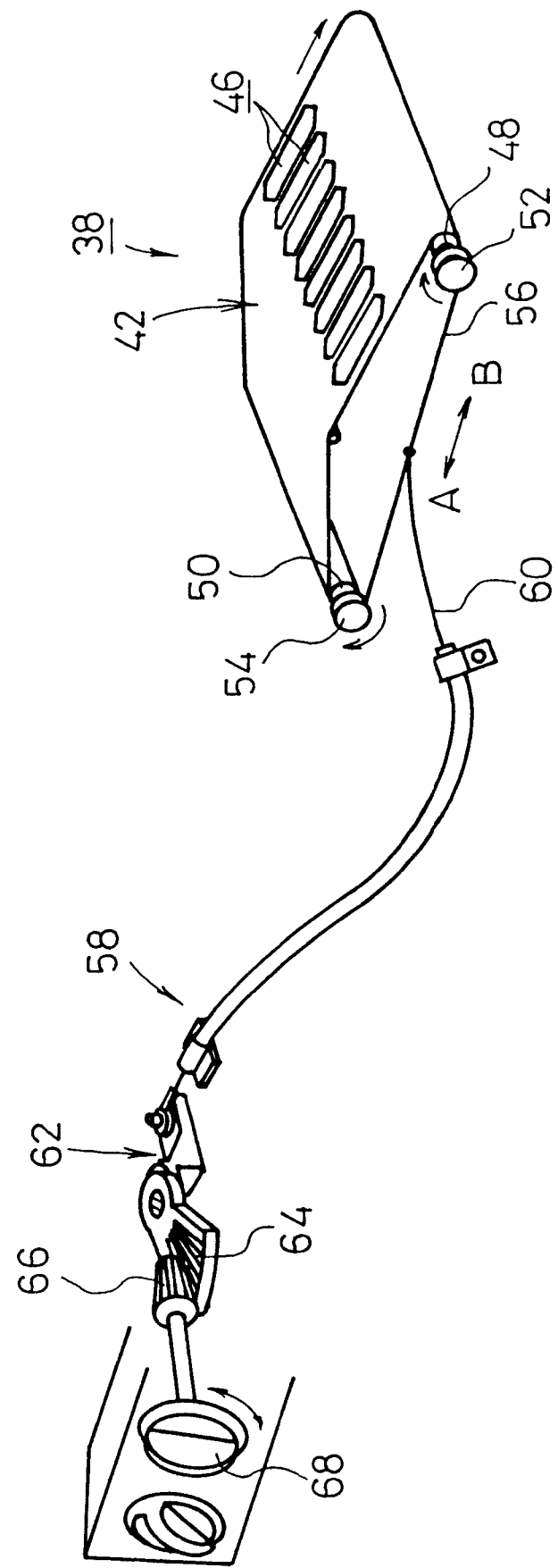
FIG. 3 is a perspective view of a damper mechanism according to a first embodiment of the present invention.

The first film-like damper 42 has a plurality of air vents 46 defined therein at a given position, and has opposite ends coupled to respective first and second takeup shafts 48, 50. As shown in FIG. 3, first and second pulleys 52, 54 are mounted respectively on ends of the first and second takeup shafts 48, 50, and interconnected by a drive wire 56 which can directly be operated by an actuating means 58.

The actuating means 58 has a wire 60 having an end joined to the drive wire 56 at a substantially intermediate position between the first and second takeup shafts 48, 50. The other end of the wire 60 is connected to an end of a lever 62. The other end of the lever 62 has a segmental gear 64 held in mesh with a gear 66 which is connected to a heater control knob (control member) 68.

The second film-like damper 44 has a plurality of air vents 47 defined therein at a given position, and is similar in structure to the first film-like damper 42. Those parts of the second film-like damper 44 which are identical to those of the first film-like damper 42 are denoted by identical reference numerals, and will not be described in detail below.

Operation of the damper mechanism 38 according to the first embodiment will be described below.

When the knob 68 is gripped and manually turned as shown in FIG. 3, it causes the gears 66, 64 to turn the lever 62. If the lever 62 is turned in a direction to pull the wire 60, the drive wire 56 fixed to the wire 60 is moved in the direction indicated by the arrow A, rotating the first and second pulleys 52, 54 in the direction indicated by the arrows. Therefore, the first film-like damper 42 is wound by the first takeup shaft 48, and unreeled from the second takeup shaft 50. The air vents 46 in the first film-like damper 42 are now displaced to a position which corresponds to the FACE air outlet 30, for example, as shown in FIG. 2.

If the lever 62 is turned in a direction to push the wire 60, the drive wire 56 fixed to the wire 60 is moved in the direction indicated by the arrow B. Therefore, the first film-like damper 42 is wound by the second takeup shaft 50, and unreeled from the first takeup shaft 48. The air vents 46 in the first film-like damper 42 are now displaced to a position which corresponds to the DEF air outlet 28, for example, as shown in FIG. 2. The second film-like damper 44 operates in the same manner as the first film-like damper 42.

In the first embodiment, the wire 60 connected to the manually operated knob 68 is directly fixed to the drive wire 56 substantially intermediate between the first and second takeup shafts 48, 50. Therefore, the damper mechanism 38 according to the present invention is made up of a smaller number of parts than a conventional damper mechanism which has gear trains combined with first and second takeup shafts. The damper mechanism 38 is thus relatively simple in structure and can be manufactured inexpensively.

Since the damper mechanism 38 has no gear trains, any backlash or play contained in the damper mechanism 38 is small, allowing the knob 68 to be operated easily and accurately and eliminating any significant power loss between the knob 68 and the first film-like damper 42. As a consequence, the first and second film-like dampers 42, 44 can easily and reliably be actuated with a minimum drive force.

Figure 4:
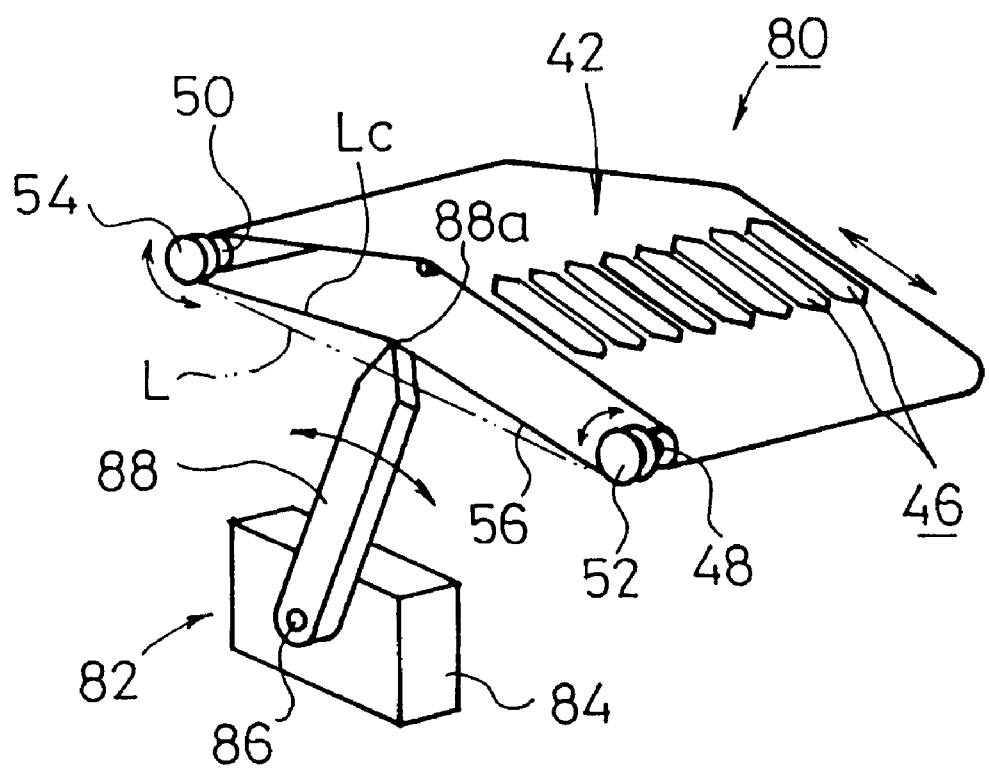
FIG. 4 is a perspective view of a damper mechanism according to a second embodiment of the present invention.

A damper mechanism 80 according to a second embodiment of the present invention is illustrated in FIG. 4. Those parts of the damper mechanism 80 which are identical to those of the damper mechanism 38 according to the first embodiment are denoted by identical reference numerals and will not be described in detail below.

Figure 5:
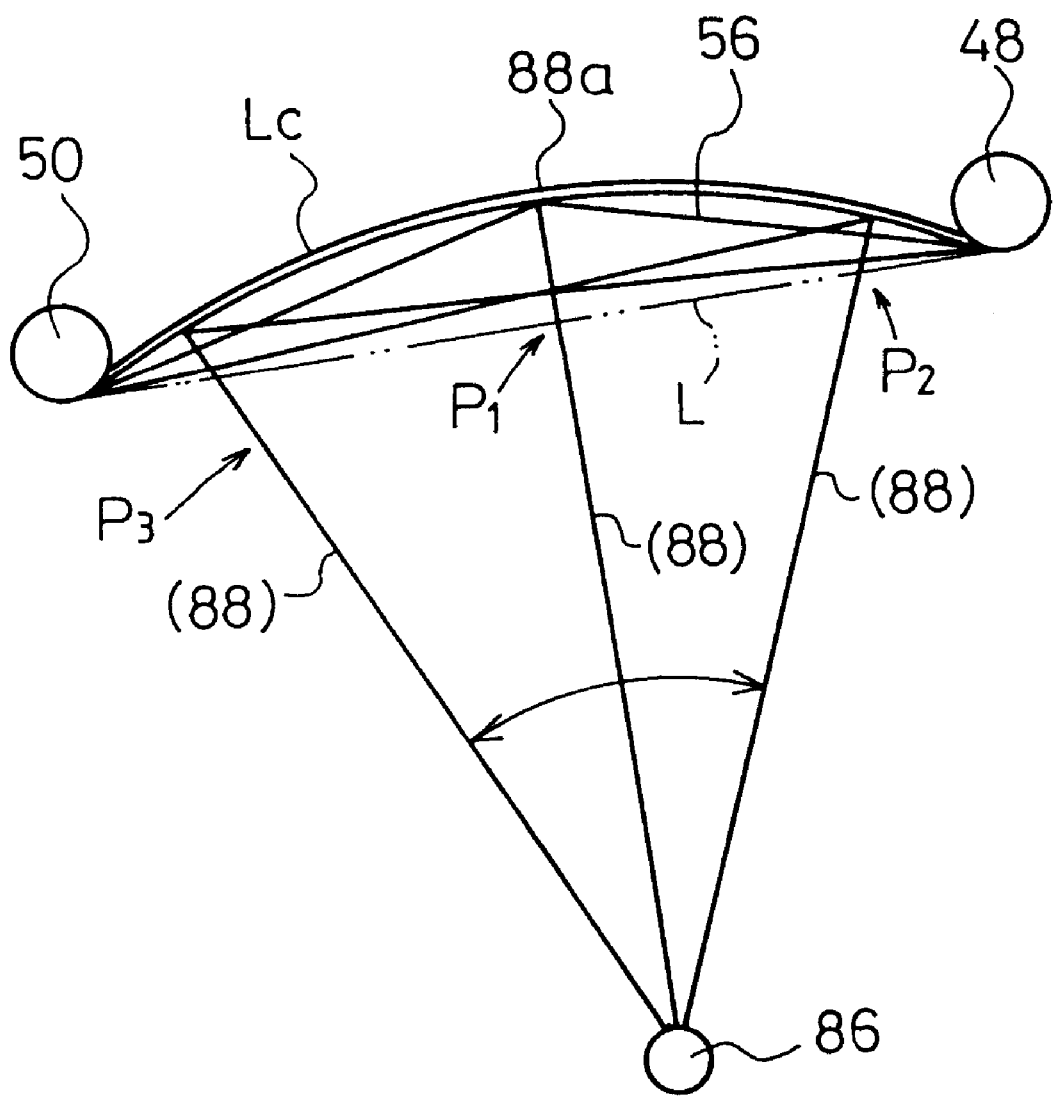
FIG. 5 is a front elevational view showing the manner in which the damper mechanism according to the second embodiment operates.

The damper mechanism 80 has an actuating means 82 comprising a servomotor 84 and a lever 88 which has an end fixed to a rotatable shaft 86 of the servomotor 84. The lever 88 has an opposite end 88a holding the drive wire 56 at a substantially intermediate position between the first and second takeup shafts 48, 50. As shown in FIG. 5, the lever 88 is positioned such that the end 88a thereof follows an arcuate path Lc on one side, remote from the rotatable shaft 86, of a straight wire path L interconnecting the first and second takeup shafts 48, 50, when the lever 88 is angularly moved.

When the servomotor 84 is energized to rotate the rotatable shaft 86, the end the lever 88 fixed to the rotatable shaft 86 is angularly displaced while holding the drive wire 56. The drive wire 56 is also angularly displaced in unison with the end 88a, moving the first film-like damper 42 connected to the first and second takeup shafts 48, 50 in one direction.

Inasmuch as the drive wire 56 is angularly displaced along the arcuate path Lc which convexly projects toward the first film-like damper 42 from the straight wire path L interconnecting the first and second takeup shafts 48, 50, a torque variation caused due to an increase in the diameter of the roll of the first film-like damper 42 wound by the first and second takeup shafts 48, 50 is eliminated. The reasons whey such a torque variation is eliminated will be described below.

Figure 6:
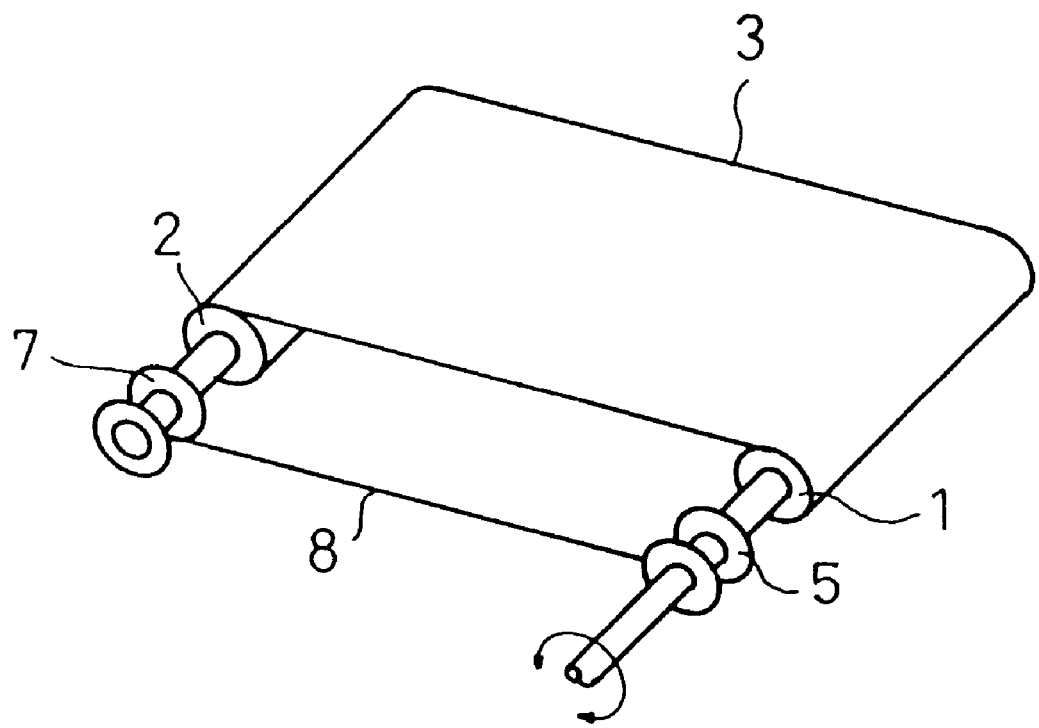
FIG. 6 is a perspective view of a conventional damper mechanism for comparison with the damper mechanism according to the second embodiment.
Figure 23:
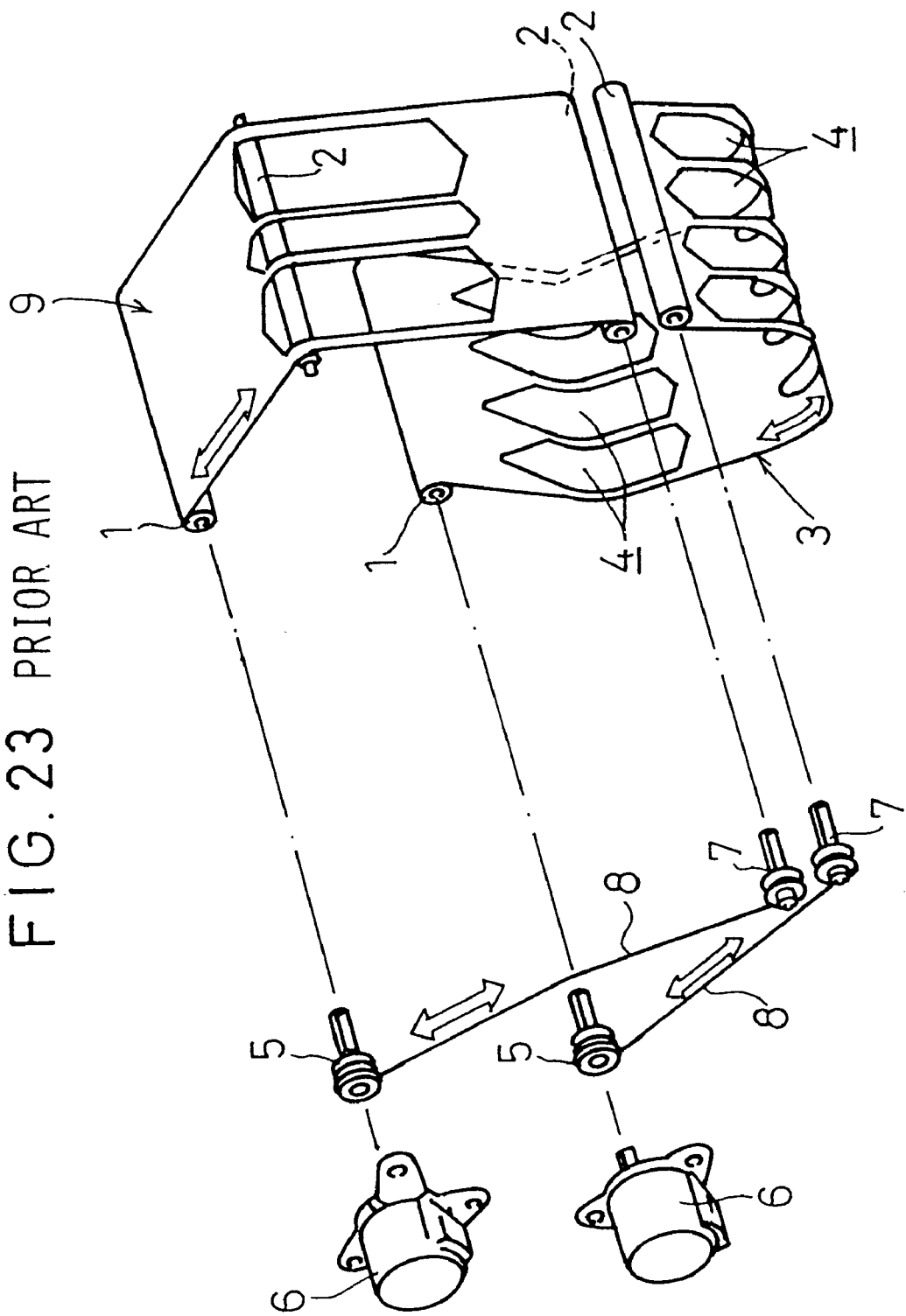
FIG. 23 is a perspective view of a conventional damper mechanism.

FIG. 6 shows a conventional damper mechanism. Those parts of the conventional damper mechanism shown in FIG. 6 which are identical to those of the conventional damper mechanism shown in FIG. 23 are denoted by identical reference numerals.

When the drive shaft 1 of the conventional damper mechanism shown in FIG. 6 is rotated in the direction indicated by the arrow C in FIG. 7A, causing the driven shaft 2 to wind the film-like damper 3, because the diameter of the roll of the film-like damper 3 on the driven shaft 2 increases, the angular displacement of the driven shaft 2 becomes smaller than the angular displacement of the drive shaft 1. Therefore, the angular displacements are related according to the relationship: the driven shaft 2<the driven pulley 7=the drive pulley 5. The difference between the driven shaft 2 and the driven pulley 7 is absorbed by a twisting of the tension spring (not shown).

When the drive shaft 1 of the conventional damper mechanism shown in FIG. 6 is rotated in the direction indicated by the arrow D in FIG. 7B, causing the drive shaft 1 to wind the film-like damper 3, because the diameter of the roll of the film-like damper 3 on the drive shaft 1 increases, the angular displacement of the driven shaft 2 becomes greater than the angular displacement of the drive shaft 1. Therefore, the angular displacements are related according to the relationship: the driven shaft 2>the driven pulley 7=the drive pulley 5. As the shafts and the pulleys are rotated in the direction opposite to the direction in FIG. 7A, the difference between the angular displacements of the driven shaft 2 and the driven pulley 7 is also absorbed by a twisting of the tension spring (not shown).

Therefore, the conventional damper mechanism requires the tension spring to be twisted in order to absorb the difference between the angular displacements of the driven shaft 2 and the driven pulley 7 when the film-like damper 3 is wound by the drive shaft 1 and the driven shaft 2. The drive shaft 1 undergoes an increase in the torque generated due to an increase in the diameter of the roll of the film-like damper 3, and needs a maximum drive torque at an end of the process of winding the film-like damper 3.

According to the second embodiment, as shown in FIG. 5, in the vicinity of an intermediate position P1 where the diameters of the rolls of the first film-like damper 42 on the first and second takeup shafts 48, 50 are substantially equal to each other, the path of the drive wire 56 is long and the distance by which it moves is large because the end 88*a* of the lever 88 is remotest from the straight wire path L. In the vicinity of positions P2, P3 near the first and second takeup shafts 48, 50 where the diameters of the rolls of the first film-like damper 42 on the first and second takeup shafts 48, 50 increase, the path of the drive wire 56 is shorter.

Therefore, as shown in FIG. 7C, when the lever 88 is angularly displaced toward the position P2 in the direction indicated by the arrow E, causing the second takeup shaft 50 to wind the first film-like damper 42, the angular displacement of the second takeup shaft 50 becomes smaller, and the angular displacement of the second pulley 54 also becomes smaller on account of a change in the path of the drive wire 56. As a result, the angular displacements are related according to the relationship: the second takeup shaft 50≈the second pulley 54<the first pulley 52.

As shown in FIG. 7D, when the lever 88 is angularly displaced toward the position P3 in the direction indicated by the arrow F, causing the first takeup shaft 48 to wind the first film-like damper 42, the angular displacement of the second takeup shaft 50 becomes greater, and the angular displacement of the second pulley 54 also becomes greater on account of a change in the path of the drive wire 56. As a result, the angular displacements are related according to the relationship: the second takeup shaft 50≈the second pulley 54>the first pulley 52.

Consequently, even when the angularly displaced position of the lever 88 varies, the angular displacements of the second takeup shaft 50 and the second pulley 54 remain substantially the same as each other, making it possible to eliminate a variation in the drive force which would otherwise result from an increase in the diameters of the rolls of the first film-like damper 42 on the first and second takeup shafts 48, 50.

FIG. 8 shows a damper mechanism 90 according to a third embodiment of the present invention. Those parts of the damper mechanism 90 which are identical to those of the damper mechanism 38 according to the first embodiment are denoted by identical reference numerals and will not be described in detail below.

The damper mechanism 90 has an actuating means 91 comprising a lever 94 angularly movable about a pivot 92 on an end thereof. The lever 94 supports, in a cavity defined therein and opening at an opposite end thereof, a tension spring (resilient body) 96 connected to opposite ends 55*a*, 55*b* of the drive wire 56 which are pushed and pulled, respectively, when the lever 94 is swung, and a stopper 98 for limiting the elongation of the tension spring 96.

The tension spring 96 has an end fixed to an inner wall surface of the cavity in the lever 94 and an opposite end connected to a slider 100 slidably disposed in the cavity. The ends 55*a*, 55*b* of the drive wire 56 are joined to the slider 100. When the stopper 98 engages an end of the slider 100, the stopper 98 prevents the slider 100 from being dislodged from the cavity in the lever 94. The open end of the cavity in the lever 94 supports a pair of rollers 102 held in rolling contact with the drive wire 56. The wire 60 has an end connected to the lever 94.

When the heater control knob (not shown in FIG. 8) is manually operated, the wire 60 connected thereto angularly displaces the lever 94 about the pivot 92 in the direction indicated by the arrow G, for example. Therefore, the first takeup shaft 48 winds up the first film-like damper 42, and the second takeup shaft 50 unreels the first film-like damper 42.

In the event that the air-conditioner is set to a large air rate setting or the case 22 is subjected to an internal pressure buildup, the first film-like damper 42 is pressed against the case 22 and suffers increased frictional forces, tending to cause the first film-like damper 42 to be displaced with respect to the takeup shaft which unreels the first film-like damper 42.

According to the third embodiment, however, the tension spring 96 is coupled to the ends 55*a*, 55*b* of the drive wire 56 which are pushed and pulled when the lever 94 is swung. When the lever 94 is swung in the direction indicated by the arrow G in FIG. 8, the end 55*a* of the drive wire 56 is pulled under the tension of the tension spring 96 and the end 55*b* of the drive wire 56 is loosened. Therefore, the tension of the tension spring 96 acts on only the end 55a of the drive wire 56, smoothly moving the first film-like damper 42 against a displacement with respect to the takeup pulley 54 which unreels the first film-like damper 42. It is possible to effectively reduce the drive force needed to rotate the takeup pulleys 52, 54.

Figure 9:
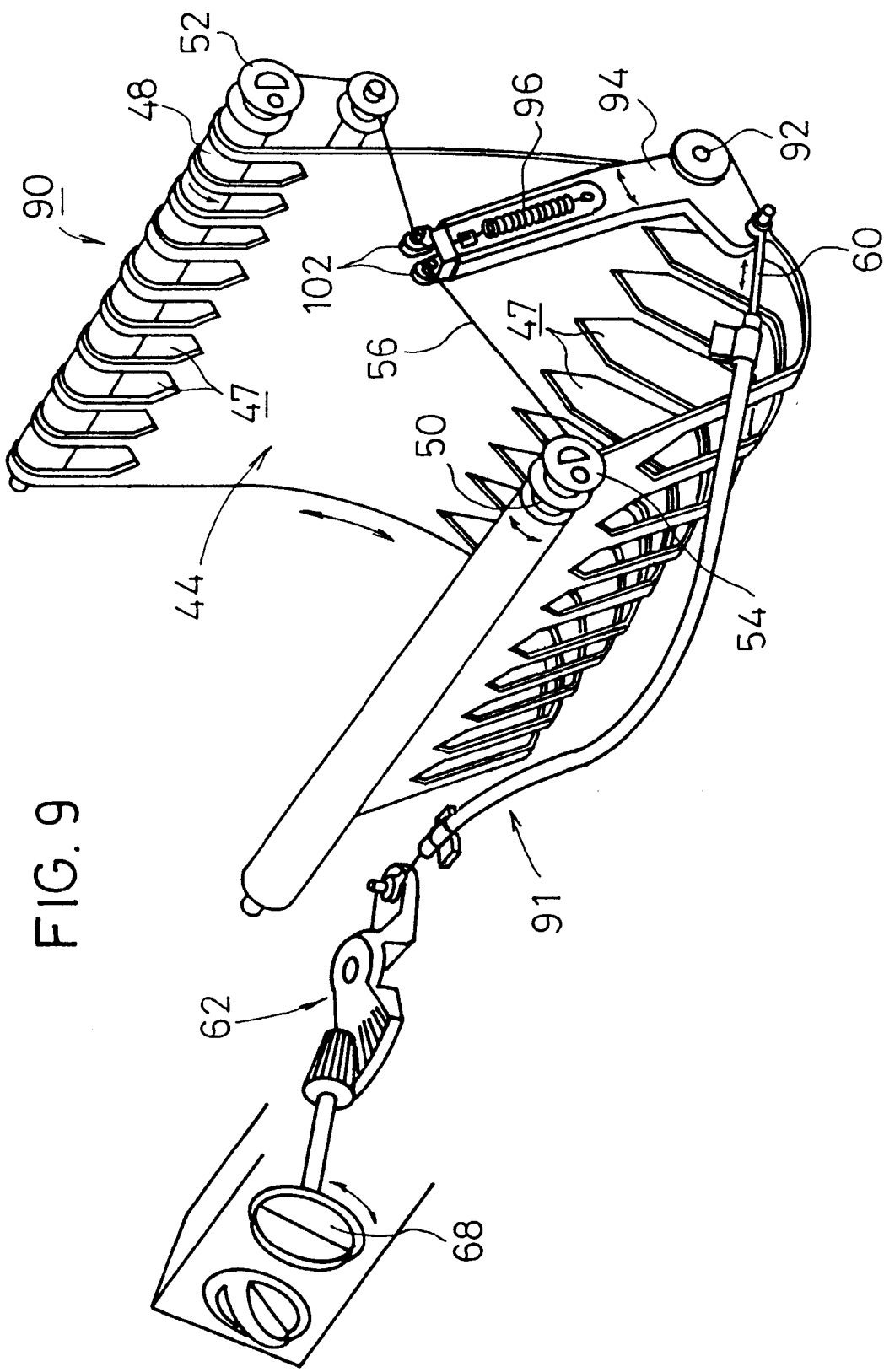
FIG. 9 is a perspective view of a first film-like damper of the damper mechanism according to the third embodiment.

The second film-like damper 44 of the damper mechanism 90 according to the third embodiment is shown in FIG. 9. Operation and advantages of the second film-like damper 44 of the damper mechanism 90 are the same as those of the first film-like damper 42.

Figure 10:
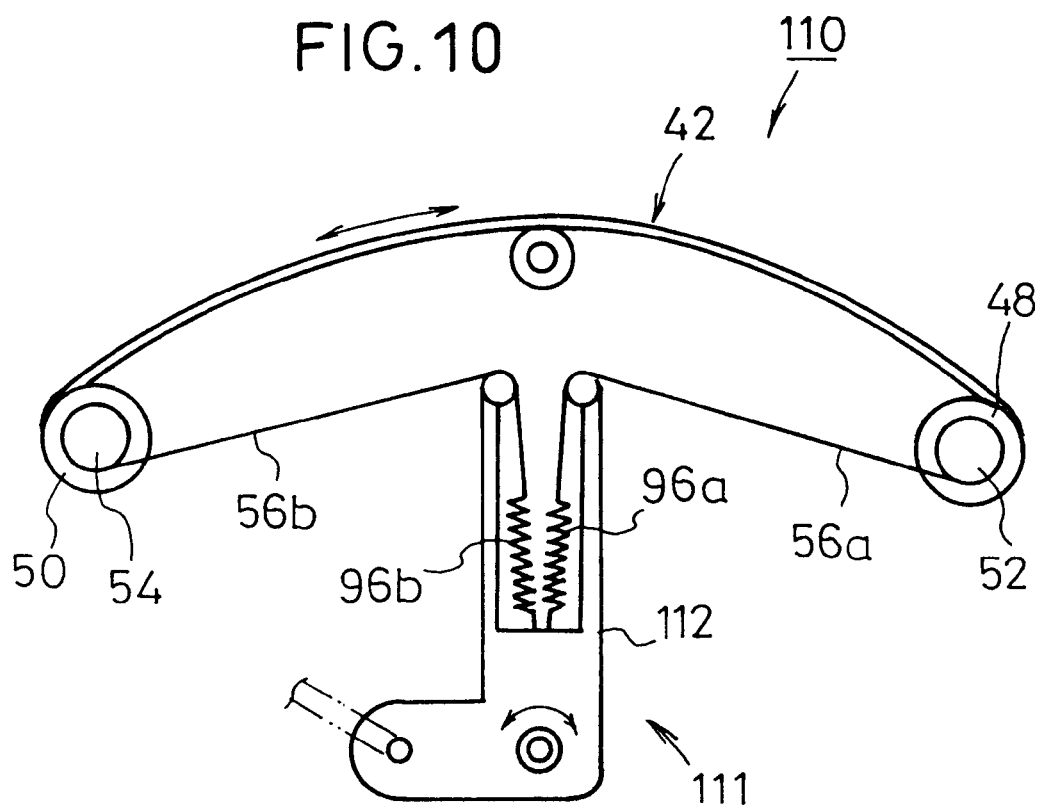
FIG. 10 is a front elevational view of a damper mechanism according to a fourth embodiment of the present invention.

A damper mechanism 110 according to a fourth embodiment of the present invention is illustrated in FIG. 10. Those parts of the damper mechanism 110 which are identical to those of the damper mechanism 90 according to the third embodiment are denoted by identical reference numerals and will not be described in detail below.

The damper mechanism 110 has an actuating means 111 comprising a first spring (first resilient body) 96a engaging a first drive wire 56a coupled to the first takeup shaft 48, and a second spring (second resilient body) 96b engaging a second drive wire 56b coupled to the second takeup shaft 50. The first and second springs 96a, 96b are housed in a lever 112.

When the lever 112 is angularly displaced, the first and second drive wires 56a, 56b are subjected to tensions and sags, which can individually be absorbed by the first and second springs 96a, 96b.

Figure 11:
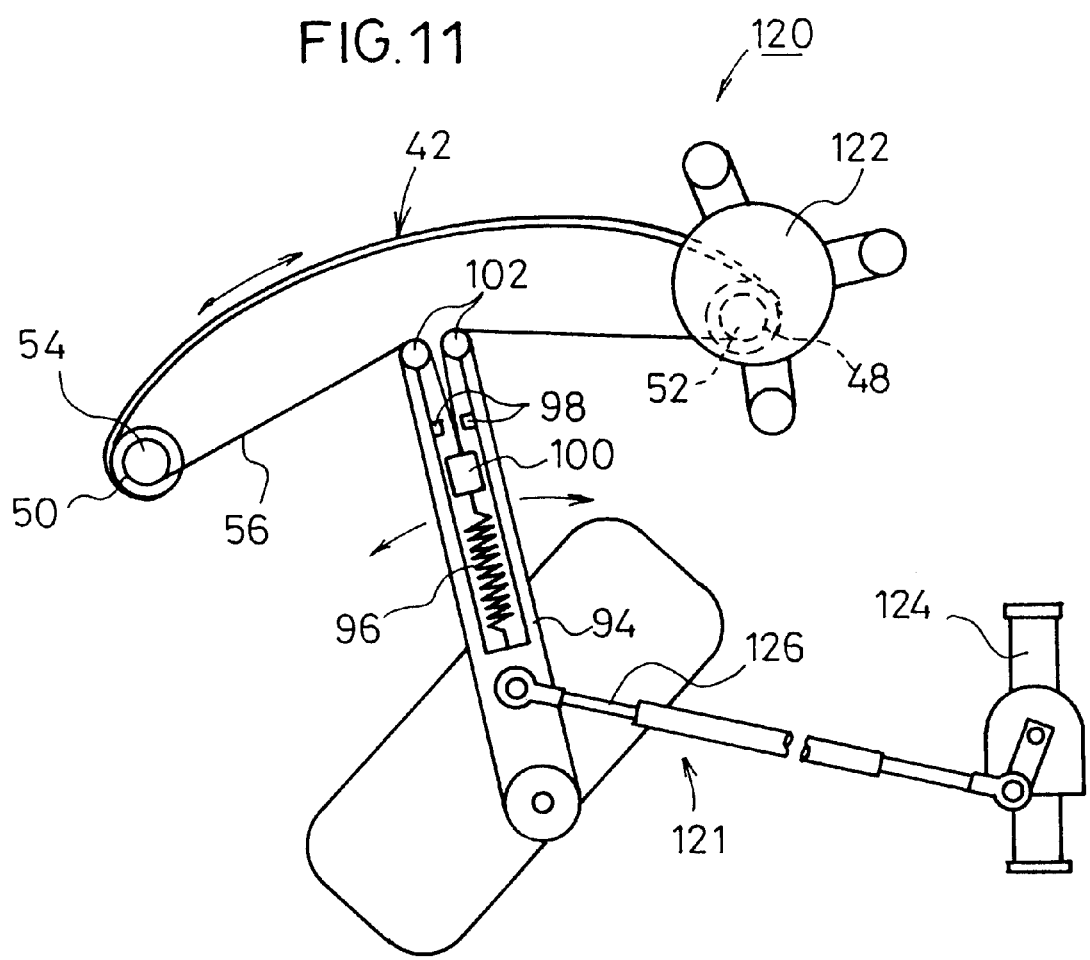
FIG. 11 is a front elevational view of a damper mechanism according to a fifth embodiment of the present invention.

A damper mechanism 120 according to a fifth embodiment of the present invention is illustrated in FIG. 11. Those parts of the damper mechanism 120 which are identical to those of the damper mechanism 90 according to the third embodiment shown in FIG. 8 are denoted by identical reference numerals and will not be described in detail below.

The damper mechanism 120 has an actuating means 121 comprising a rotary actuator such as a stepping motor 122 coupled to the first takeup shaft 48. To the lever 94, there is connected a wire 126 for opening and closing a water valve 124 which supplies hot water from an engine compartment to a heater core (not shown) of the air-conditioner.

The lever 94 is effective to eliminate a variation in the drive force due to an increase in the diameter of the roll of the first-film damper 42, thereby preventing a torque required to move the first-film damper 42 from being unduly increased. Therefore, the stepping motor 122 alone can both angularly move the lever 94 and open and close the water valve 124. The damper mechanism 120 allows the air-conditioner to be made up of a reduced number of parts and also to be manufactured inexpensively.

Figure 12:
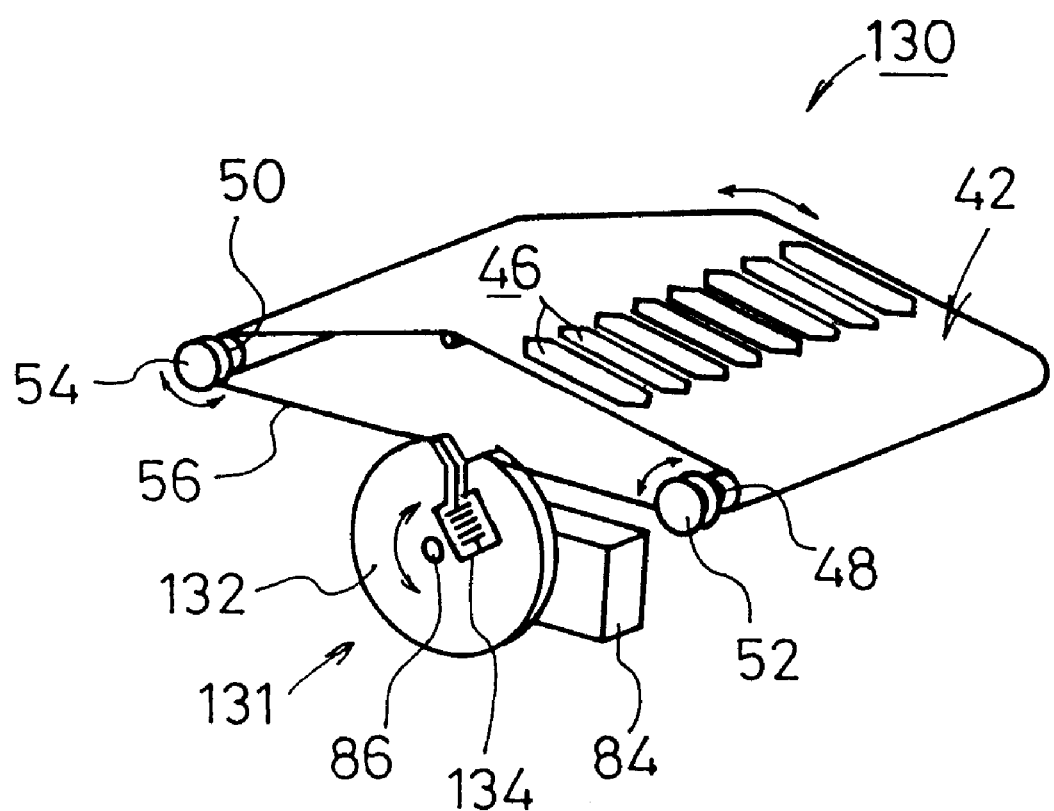
FIG. 12 is a perspective view of a damper mechanism according to a sixth embodiment of the present invention.

FIG. 12 shows a damper mechanism 130 according to a sixth embodiment of the present invention. Those parts of the damper mechanism 130 which are identical to those of the damper mechanism 80 according to the second embodiment shown in FIG. 4 are denoted by identical reference numerals and will not be described in detail below.

The damper mechanism 130 has an actuating means 131 comprising a rotary disk member 132 fixed to the rotatable shaft 86 of the servomotor 84. The drive wire 56 is wound around the rotary disk member 132 and tensioned by a spring (resilient body) 134 mounted on the rotary disk member 132. When the rotary disk member 132 is rotated in the direction indicated by the arrow by the servomotor 84, the drive wire 56 on the rotary disk member 132 is directly actuated to move the first film-like damper 42. The damper mechanism 130 offers the same advantages as those of the damper mechanism 80 according to the second embodiment.

Figure 13:
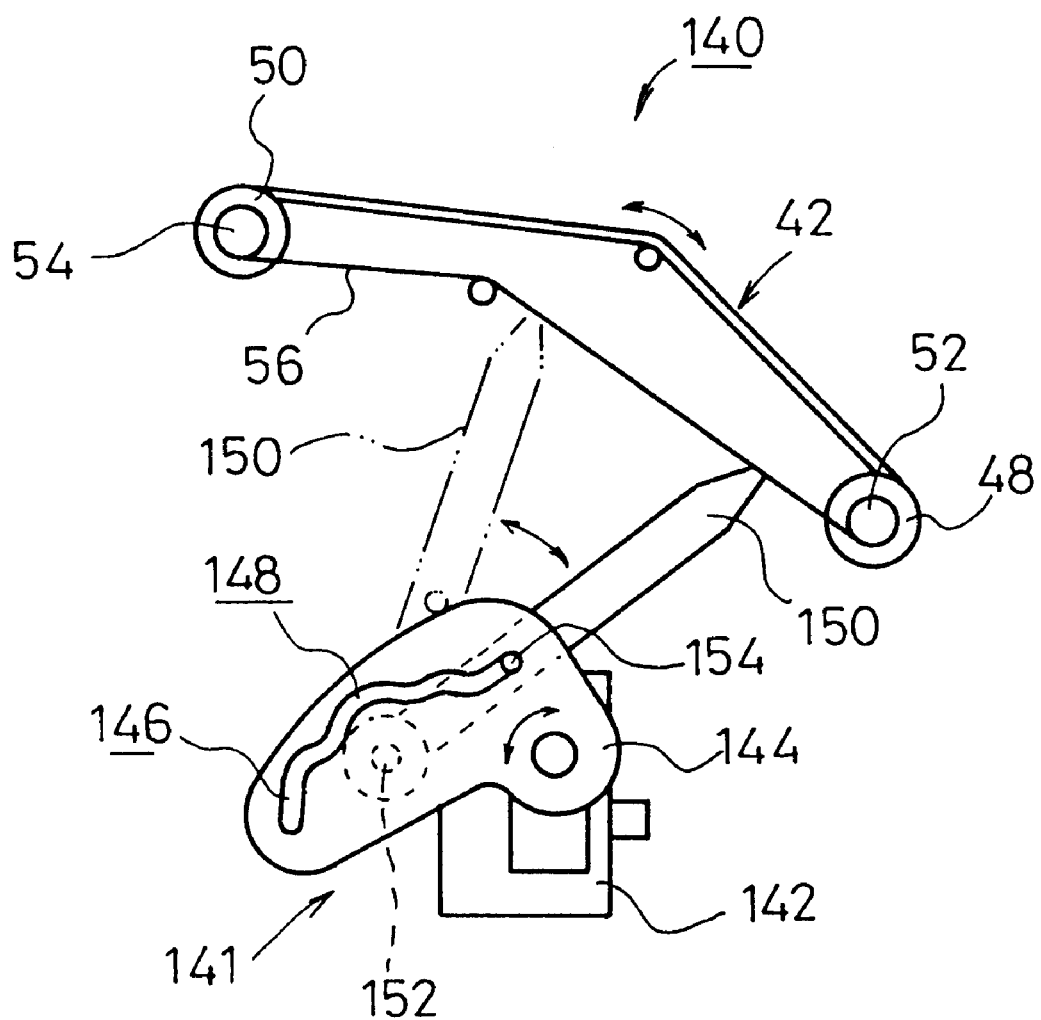
FIG. 13 is a front elevational view of a damper mechanism according to a seventh embodiment of the present invention.

FIG. 13 shows a damper mechanism 140 according to a seventh embodiment of the present invention. The damper mechanism 140 has an actuating means 141 comprising a servomotor 142 as a rotary actuator, and a link plate (link means) 144 rotatable by the servomotor 142. The link plate 144 has a guide groove 148 defined therein which includes an idle section 146. A lever 150 having an end fixed to the drive wire 56 is angularly movably supported by a pivot 152 on its opposite end, and has a guide pin 154 slidably inserted in the guide groove 148.

When the link plate 144 is rotated by the servomotor 142, the lever 150 is angularly moved by the guide pin 154 which is slidably guided in the guide groove 148, displacing the drive wire 56 in a given direction there by to move the first film-like damper 42.

Even if the servomotor 142 stops in error, the idle section 146 of the guide groove 148 can absorb such a stop error of the servomotor 142 when the guide pin 154 is positioned in the idle section 146. Accordingly, the lever 150 is maintained highly accurately in its stop position. As a result, the first film-like damper 42 can be stopped highly accurately in a desired position using the servomotor 142.

Figure 14:
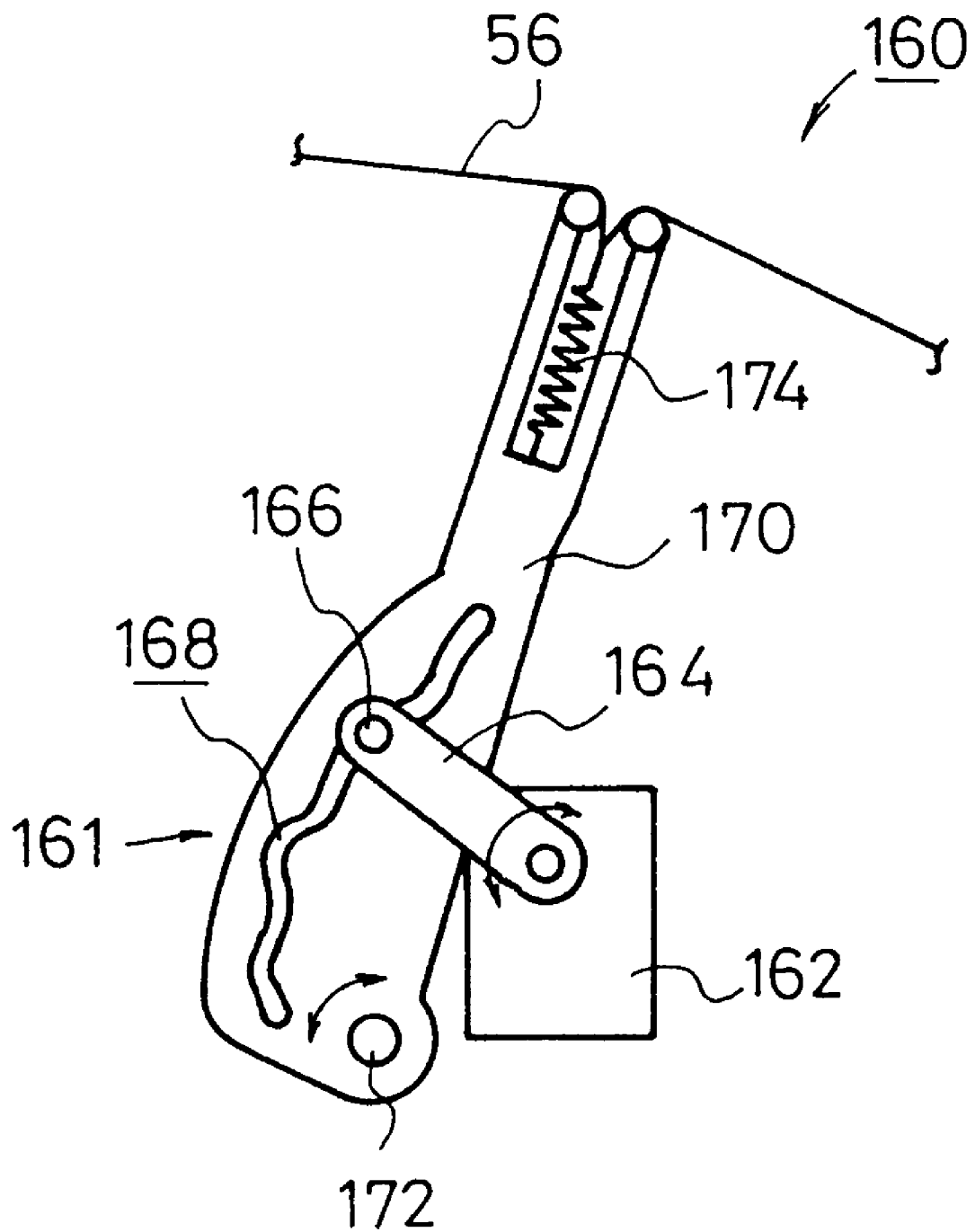
FIG. 14 is a fragmentary front elevational view of a damper mechanism according to an eighth embodiment of the present invention.

FIG. 14 shows a damper mechanism 160 according to an eighth embodiment of the present invention, which is similar to the damper mechanism 140 shown in FIG. 13. As shown in FIG. 14, the damper mechanism 160 has an actuating means 161 comprising a servomotor 162, a link member (link means) 164 rotatable by the servomotor 162, and a lever 170 having a guide groove 168 which receives therein a guide pin 166 mounted on an end of the link member 164. The lever 170 is angularly movable about a pivot 172 and houses a spring (resilient body) 174 disposed in a distal end thereof. The spring 174 is connected to the drive wire 56 for normally urging the drive wire 56 to be pulled toward the pivot 172.

The drive wire 56 is normally urged toward the pivot 172 by the spring 174 so as to be smoothly actuated. The damper mechanism 160 also offers the same advantages as those of the damper mechanism 140 according to the seventh embodiment.

Figure 15:
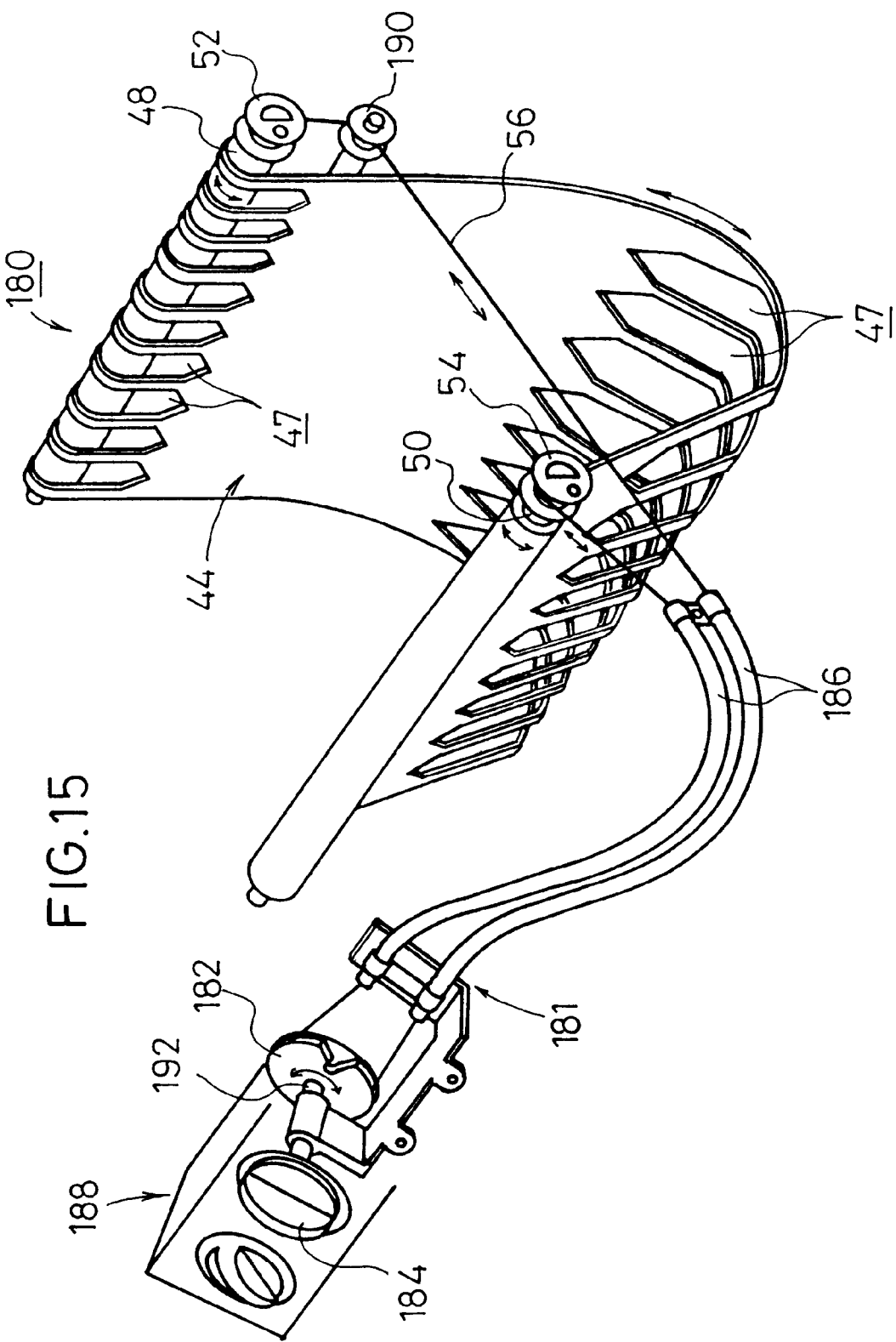
FIG. 15 is a perspective view of a damper mechanism according to a ninth embodiment of the present invention.

FIG. 15 shows a damper mechanism 180 according to a ninth embodiment of the present invention. The damper mechanism 180 shown in FIG. 15 is applied to the second film-like damper 44. Those parts of the damper mechanism 180 which are identical to those of the damper mechanism 38 according to the first embodiment are denoted by identical reference numerals and will not be described in detail below.

The damper mechanism 180 has an actuating means 181 comprising a pulley 182 winding and holding thereon the drive wire 56 at a substantially intermediate position between the first and second takeup shafts 48, 50, and a knob 184 directly coupled to the pulley 182 for manually rotating the pulley 182.

The drive wire 56 extends through a pair of outer tubes 186 into a controller 188 which has the knob 184, and is trained around an idle pulley 190 disposed near the first takeup shaft 48. The pulley 182 is connected to the knob 184 through a shaft 192, and one loop of the drive wire 56 extending out of the outer tubes 186 is trained around the pulley 182. An intermediate portion of the drive wire 56 is fixed to the pulley 182.

When the knob 184 of the controller 188 is manually operated, the pulley 182 is rotated by the shaft 192, moving the drive wire 56 fixed to the pulley 182. The first and second takeup shafts 48, 50 are rotated, moving the second film-like damper 44 to displace the air vents 47 to a desired position for adjusting the temperature of air discharged from the air-conditioner.

The damper mechanism 180 according to the ninth embodiment is advantageous in that any backlash contained therein is small enough to improve the each with which the knob 184 is operated, any power loss is reduced to effectively reduce the drive force required to move the second film-like damper 44, and the damper mechanism 180 is made up of a reduced number of parts and hence can be manufactured inexpensively.

Figure 16:
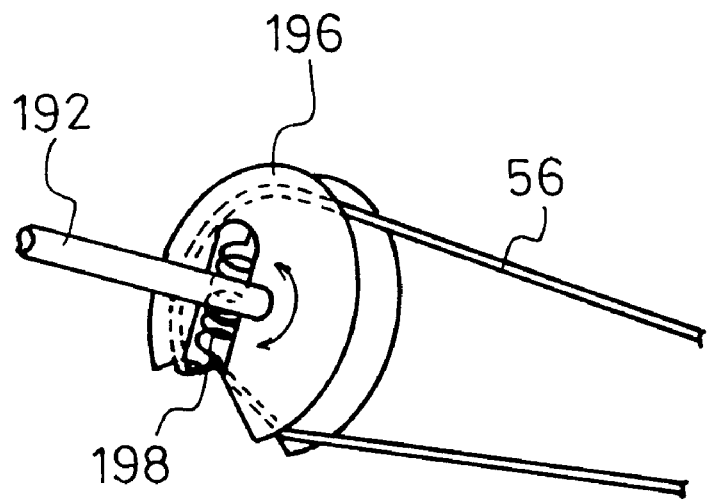
FIG. 16 is a perspective view of a pulley of a damper mechanism according to a tenth embodiment of the present invention.

FIG. 16 shows a damper mechanism according to a tenth embodiment which is similar to the damper mechanism 180 according to the ninth embodiment except that the pulley 182 is replaced with a pulley 196. The pulley 196 houses a tension spring (resilient body) 198 therein for normally pulling the drive wire 56 on the pulley 196 radially inwardly. The tension spring 198 is thus effective in smoothly eliminating tensions and sags which would are liable to occur when the pulley 196 is rotated.

Figure 17:
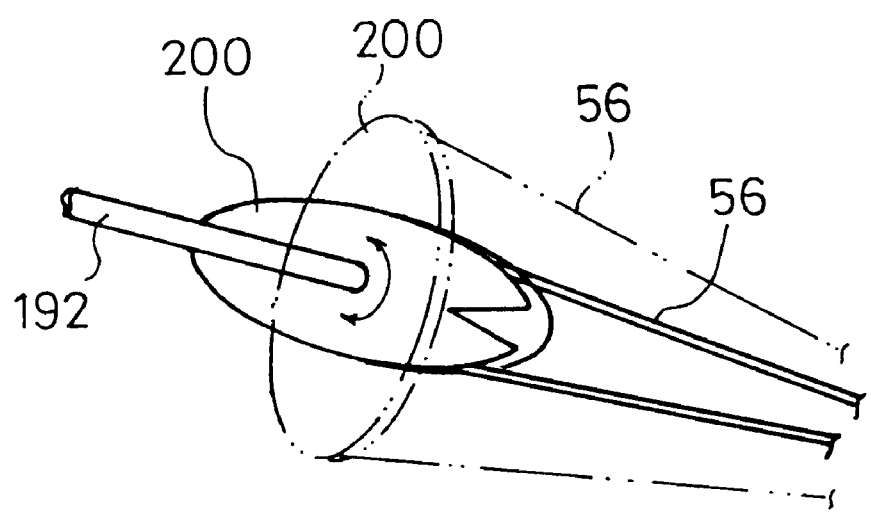
FIG. 17 is a perspective view of a pulley of a damper mechanism according to an eleventh embodiment of the present invention.

FIG. 17 shows a damper mechanism according to an eleventh embodiment which is similar to the damper mechanism 180 according to the ninth embodiment except that the pulley 182 is replaced with a substantially elliptical pulley 200. The pulley 200 is of such a shape that it will move the drive wire 56 a larger distance when the second film-like damper 44 is wound to substantially equal diameters on the first and second takeup shafts 48, 50 and will move the drive wire 56 a smaller distance when the second film-like damper 44 is wound to a greater thickness on one of the first and second takeup shafts 48, 50. The pulley 200 is effective to easily and reliably absorb a variation in the operation torque which would otherwise tend to occur when the second film-like damper 44 is wound.

Figure 18:
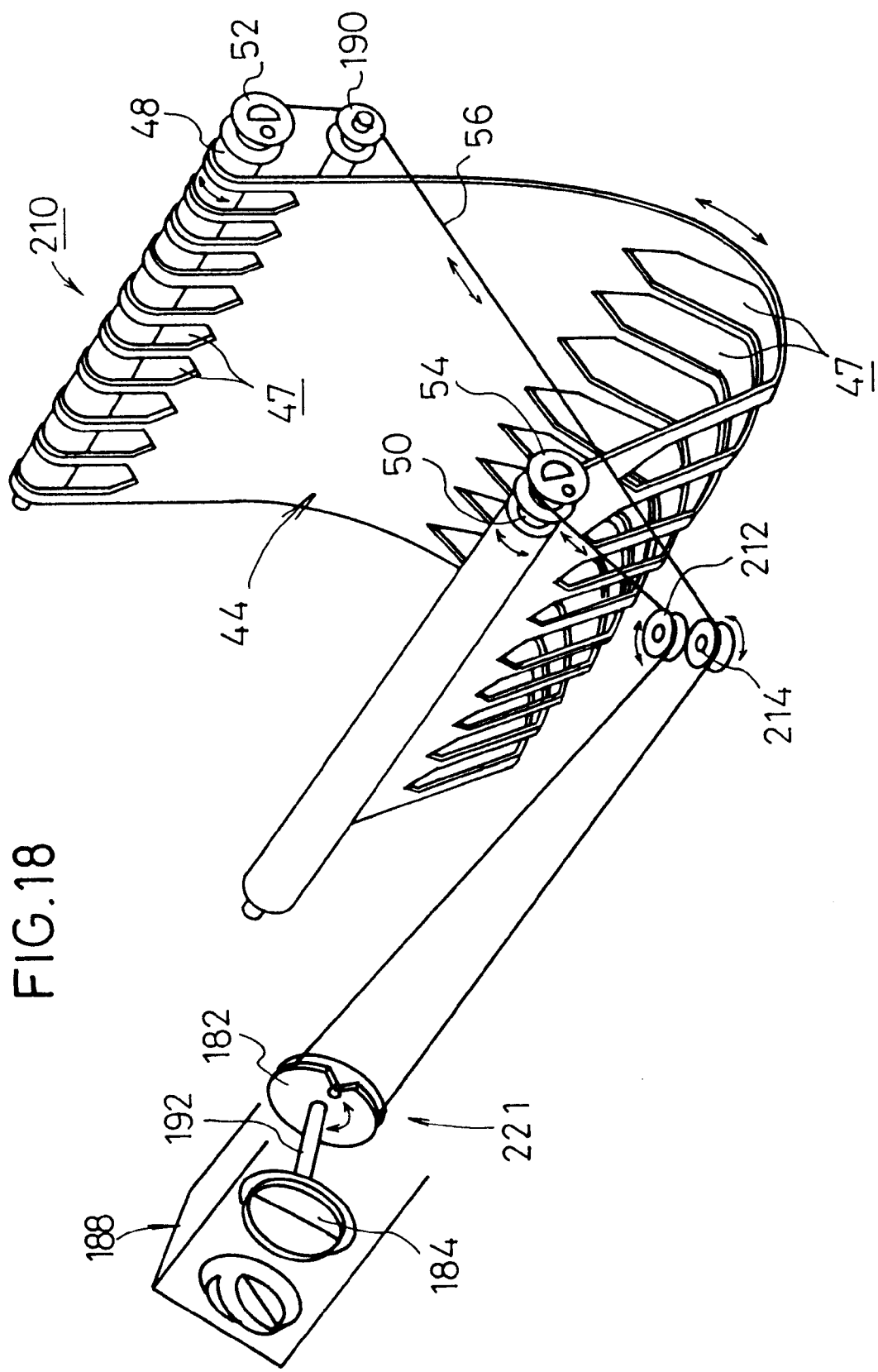
FIG. 18 is a perspective view of a damper mechanism according to a twelfth embodiment of the present invention.

FIG. 18 shows a damper mechanism 210 according to a twelfth embodiment of the present invention. Those parts of the damper mechanism 210 which are identical to those of the damper mechanism 180 according to the ninth embodiment shown in FIG. 15 are denoted by identical reference numerals and will not be described in detail below.

The damper mechanism 210 has an actuating means 221 comprising idle pulleys 212, 214 instead of the outer tubes 186 of the damper mechanism 180 according to the ninth embodiment. The idle pulleys 212, 214 are positioned for changing the direction in which the drive wire 56 extends from the first and second takeup shafts 48, 50. The drive wire 56 extends from the idle pulleys 212, 214 to the pulley 182. Therefore, the damper mechanism 210 offers the same advantages as those of the damper mechanism 180 according to the ninth embodiment.

Figure 19:
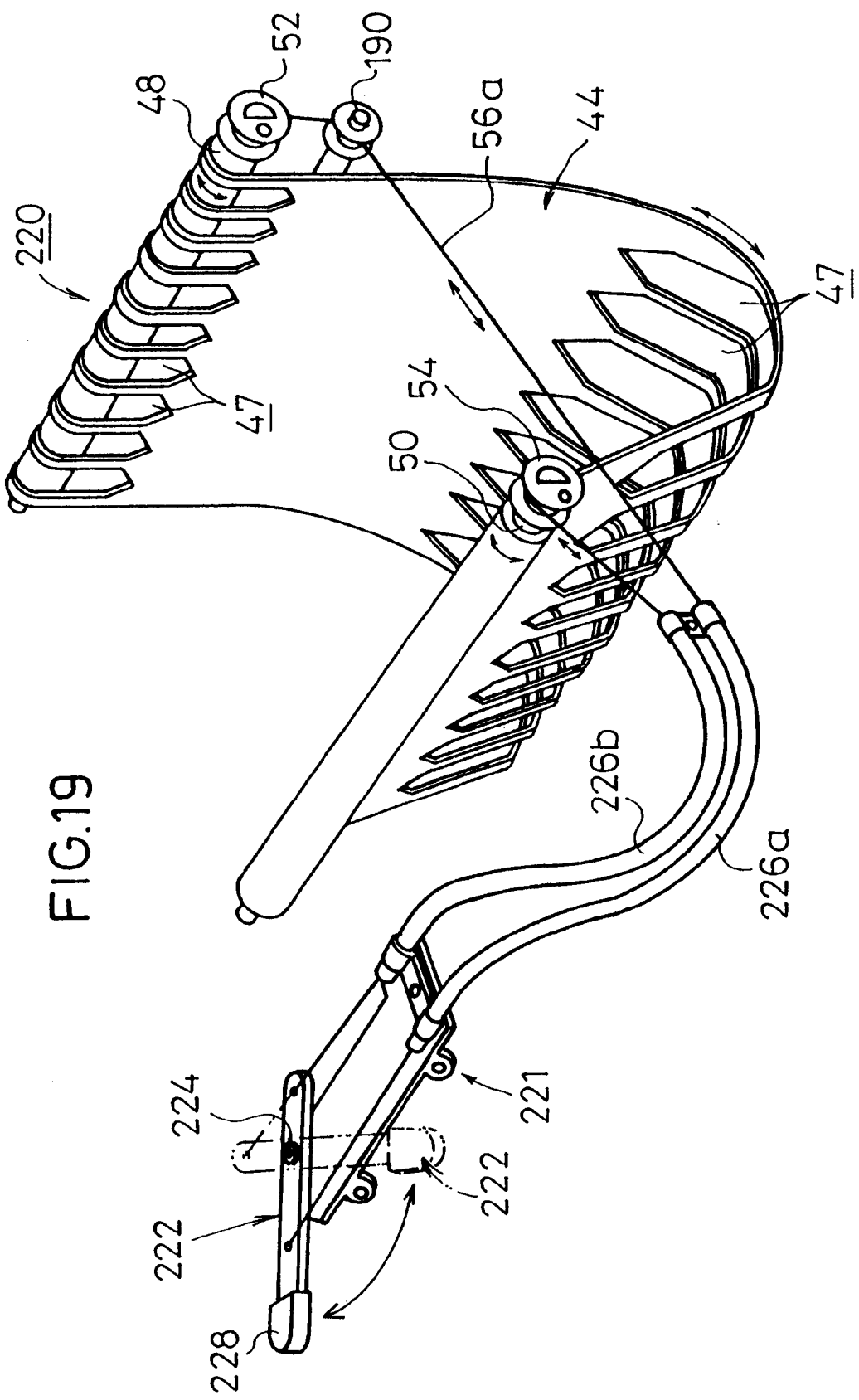
FIG. 19 is a perspective view of a damper mechanism according to a thirteenth embodiment of the present invention.

FIG. 19 shows a damper mechanism 220 according to a thirteenth embodiment of the present invention. The damper mechanism 220 has an actuating means 221 comprising a control lever 222 instead of the knob 184 of the damper mechanism 180 according to the ninth embodiment. The control lever 222 is angularly movable about a pivot 224. A first drive wire 56a coupled to the first takeup shaft 48 extends through an outer tube 226a and is connected to the control lever 222 between the pivot 224 and a grip 228 on one end of the control lever 222. A second drive wire 56b coupled to the second takeup shaft 50 extends through an outer tube 226b and is connected to the control lever 222 at an opposite end thereof on one side of the pivot 224 remote from the grip 228.

When the grip 228 is gripped and the control lever 222 is turned in the direction indicated by the arrows, the first and second drive wires 56a, 56b are moved directly thereby for thereby moving the second film-like damper 44. Therefore, the damper mechanism 220 offers the same advantages as those of the damper mechanism 180 according to the ninth embodiment.

Figure 20:
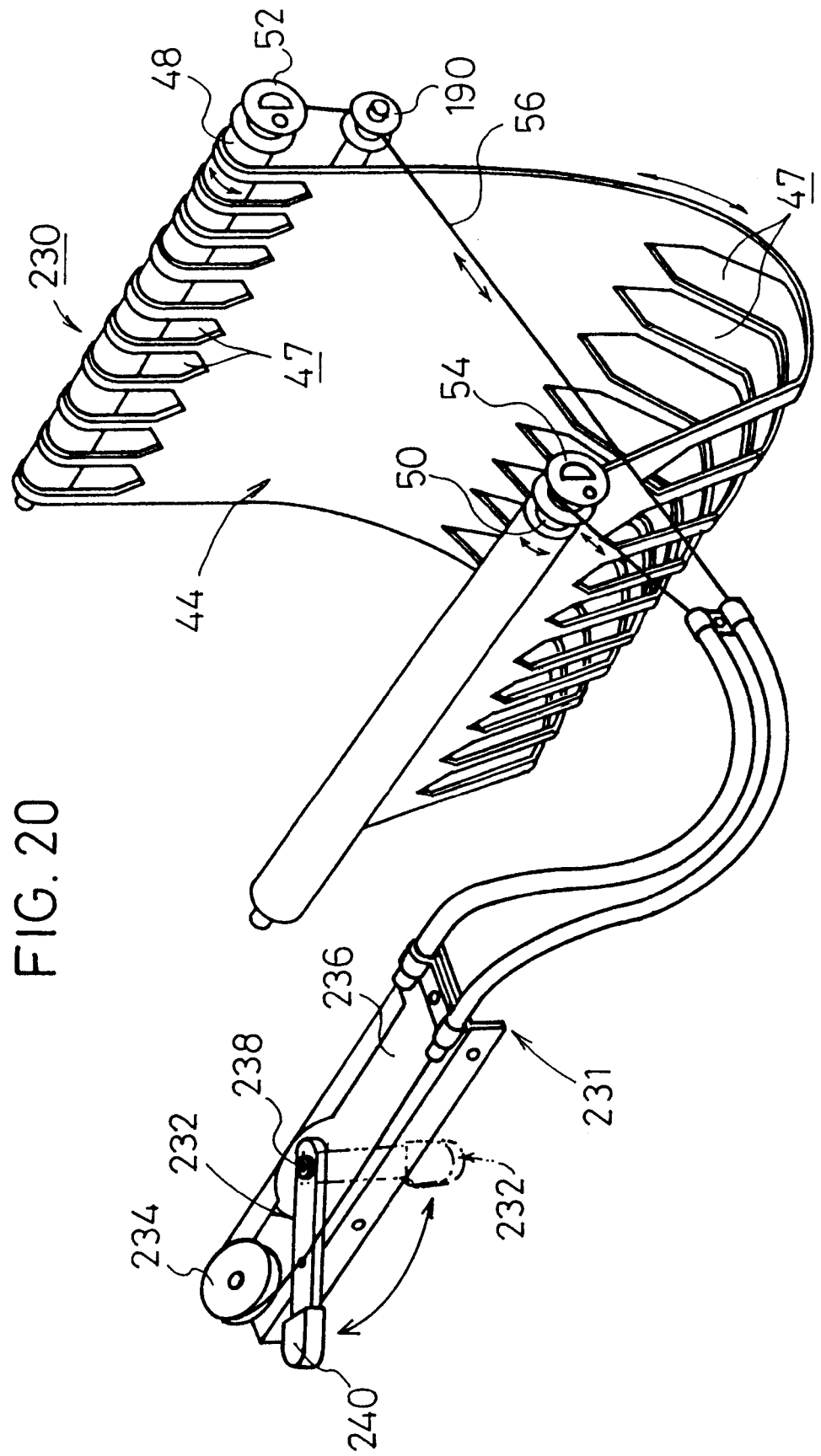
FIG. 20 is a perspective view of a damper mechanism according to a fourteenth embodiment of the present invention.

FIG. 20 shows a damper mechanism 230 according to a fourteenth embodiment of the present invention. The damper mechanism 230 has an actuating means 231 comprising a manually operated control lever 232 to which the drive wire 56 is fixed, and an idle pulley 234 which holds the drive wire 56 at a substantially intermediate position between the first and second takeup shafts 48, 50.

The control lever 232 is angularly movably supported on a support base 236 by a pivot 238, and the idle pulley 234 is rotatably supported on the support base 236. The control lever 232 supports a grip 240 on one end thereof remote from the pivot 238. When the grip 240 is gripped and the control lever 232 is turned in the direction indicated by the arrows, the second film-like damper 44 is moved through the drive wire 56. Therefore, the damper mechanism 230 offers the same advantages as those of the damper mechanism 220 according to the thirteenth embodiment.

Figure 21:
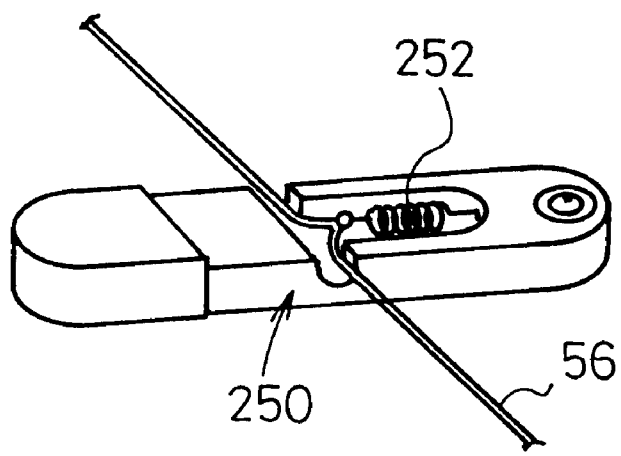
FIG. 21 is a perspective view of a control lever of a damper mechanism according to a fifteenth embodiment of the present invention.

FIG. 21 shows a damper mechanism according to a fifteenth embodiment which is similar to the damper mechanism 230 according to the fourteenth embodiment except that the control lever 232 is replaced with a control lever 250. The control lever 250 houses a tension spring (resilient body) 252 therein for normally pulling the drive wire 56 into the control lever 250.

Figure 22:
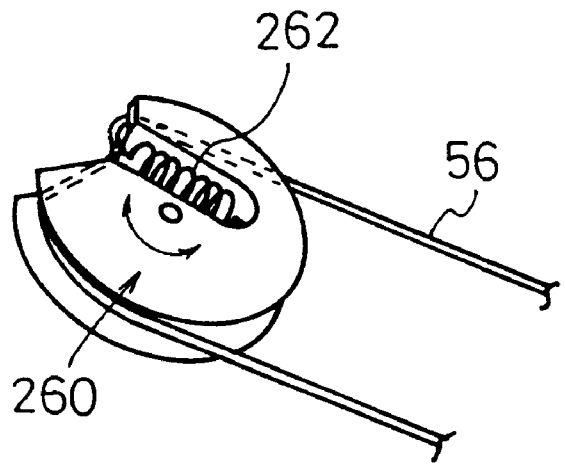
FIG. 22 is a perspective view of an idle pulley of a damper mechanism according to a sixteenth embodiment of the present invention.

FIG. 22 shows a damper mechanism according to a sixteenth embodiment which is similar to the damper mechanism 230 according to the fourteenth embodiment except that the idle pulley 234 is replaced with an idle pulley 260. The idle pulley 260 houses a tension spring (resilient body) 262 therein for normally pulling the drive wire 56 on the idle pulley 260 radially inwardly.

In the fifteenth and sixteenth embodiments, the drive wire 56 is normally held under tension so as to be smoothly operated.

In the damper mechanism according to the present invention, the drive wire is directly held to move the film-like damper. The damper mechanism according to the present invention is made up of a reduced number of parts, is free of backlash or play, and can be operated smoothly and efficiently.

In an embodiment, when the swingable lever which holds the drive wire is angularly moved along the arcuate path on one side, remote from the pivot, of the straight wire path interconnecting the first and second takeup shafts, the distance by which the drive wire moves is varied to reduce a variation in the drive torque due to an increase in the diameter of the film-like damper, so that the film-like damper can be operated effectively. The resilient body engaging the drive wire is disposed in one end of the lever to allow the film-like damper to move smoothly. The stopper prevents the drive wire from being dislodged from the lever. If the drive wire is divided into first and second drive wires coupled respectively to the first and second takeup shafts, and first and second resilient bodies act on the first and second drive wires, respectively, then the lever can be operated effectively.

When the rotary actuator coupled to one of the takeup shafts is energized, the lever can be angularly moved and the water valve can be actuated at the same time. If the lever is angularly moved by the link means coupled to the rotary actuator and the link means has the idle section, then a stop error of the rotary actuator can be absorbed to hold the lever accurately in a desired stop position. The lever may be replaced with a rotating member.

When the control member coupled to the pulley on which the drive wire is trained is manually operated, the film-like damper is moved through the drive wire. Therefore, the film-like damper can be moved effectively by manual operation of the control lever. The drive wire can be held under desired tension by the resilient body which is disposed in the pulley for pulling the drive wire. If the pulley is of an elliptical shape, then it can reliably absorb, with a simple elliptical pulley structure, a variation in the control torque due to an increase in the diameter of the roll of the film-like damper. The idle pulley placed between the pulley and the first and second takeup shafts permits the drive wire to extend in various directions from the first and second takeup shafts.

If the first and second drive wires are fixed to the manually operated control lever or the idle pulley holding the drive wire is mounted on the manually operated control lever, then the control lever can smoothly be operated. The resilient body for pulling the drive wire may be housed in the control lever or the idle pulley for eliminating tensions or sags in the drive wire.

Although certain preferred embodiments of the present invention have been shown and described in detail, it should be understood that various changes and modifications may be made therein without departing from the scope of the appended claims.

What is claimed is:

1. A damper mechanism for use in an automotive air-conditioner, comprising:
   a film-like damper having a plurality of air vents defined therein;
   first and second takeup shafts winding thereon respective opposite ends of said film-like damper;
   a drive wire coupled to said first and second takeup shafts for rotating said first and second takeup shafts in unison with each other; and
   actuating means directly holding said drive wire between said first and second takeup shafts for rotating said first and second takeup shafts to move said film-like damper.

2. A damper mechanism according to claim 1, wherein said actuating means comprises a wire coupled at one end thereof to said drive wire at a substantially intermediate position between said first and second takeup shafts, further comprising a control member coupled to an opposite end of said wire for pulling and pushing the wire.

3. A damper mechanism according to claim 1, wherein said actuating means comprises a lever holding at an end thereof said drive wire at a substantially intermediate position between said first and second takeup shafts, said lever being angularly movable about an opposite end thereof and positioned such that said end thereof follows an arcuate path on one side, remote from said opposite end, of a straight wire path interconnecting said first and second takeup shafts when said lever is angularly moved.

4. A damper mechanism according to claim 3, further comprising a resilient body disposed in an end of said lever and coupled to opposite ends of said drive wire which are pulled and pushed, respectively, when said lever is angularly moved.

5. A damper mechanism according to claim 3, further comprising:
   a resilient body disposed in an end of said lever and coupled to said drive wire for pulling said drive wire toward an opposite end of the lever; and
   a stopper disposed in said lever for limiting an elongation of said resilient body.

6. A damper mechanism according to claim 3, wherein said drive wire comprises first and second drive wires connected respectively to said first and second takeup shafts, further comprising:
   a first resilient body disposed in an end of said lever and coupled to said first drive wire for pulling said drive wire toward an opposite end of the lever; and
   a second resilient body disposed in said end of said lever and coupled to said second drive wire for pulling said second drive wire toward said opposite end of the lever.

7. A damper mechanism according to claim 3, wherein said actuating means comprises:
   a rotary actuator coupled to either one of said first and second takeup shafts; and
   a wire coupled to said lever for opening and closing a water valve which supplies hot water from an engine compartment to a heater core of the automotive air-conditioner.

8. A damper mechanism according to claim 3, wherein said actuating means comprises:
   a rotary actuator; and
   link means operable by said rotary actuator, for angularly moving said lever;
   said link means having an idle section for absorbing a stop error of said rotary actuator.

9. A damper mechanism according to claim 3, wherein said actuating means comprises:
   a rotary actuator; and
   link means operable by said rotary actuator, for angularly moving said lever;
   said lever having in an end thereof a resilient body for normally pulling said drive wire toward a pivot on opposite end of said lever.

10. A damper mechanism according to claim 1, wherein said actuating means comprises:
    a rotary actuator; and
    a rotatable member rotatable by said rotary actuator and holding said drive wire at a substantially intermediate position between said first and second takeup shafts.

11. A damper mechanism according to claim 10, wherein said drive wire is trained around said rotatable member, said rotatable member having a resilient body for pulling said drive wire.

12. A damper mechanism according to claim 1, wherein said actuating means comprises:
    a pulley winding and holding thereon said drive wire at a substantially intermediate position between said first and second takeup shafts; and
    a control member directly coupled to said pulley and manually operable to rotate said pulley.

13. A damper mechanism according to claim 12, wherein said pulley houses therein a resilient body for pulling said drive wire wound and held on aid pulley.

14. A damper mechanism according to claim 12, wherein said pulley is of a substantially elliptical shape for varying a distance by which said drive wire moves in order to absorb a variation in operation torque when said drive wire is wound by said first and second takeup shafts.

15. A damper mechanism according to claim 12, further comprising idle pulleys disposed between said pulley and said first and second takeup shafts, for changing a direction in which said drive wire extends.

16. A damper mechanism according to claim 1, wherein said drive wire comprises first and second drive wires connected respectively to said first and second takeup shafts, and said actuating means comprises:

a manually operable control lever;

said first and second drive wires being fixed to said manually operable control lever.

17. A damper mechanism according to claim 1, wherein said actuating means comprises:

a manually operable control lever to which said drive wire is fixed; and an idle pulley holding said drive wire at a substantially intermediate position between said first and second takeup shafts.

18. A damper mechanism according to claim 17, wherein said control lever houses therein a resilient body for pulling said drive wire.

19. A damper mechanism according to claim 17, wherein said idle pulley houses therein a resilient body for pulling said drive wire.

* * * * *